US012751461B2

(12) United States Patent
Yvin et al.

(10) Patent No.: US 12,751,461 B2
(45) Date of Patent: Oct. 6, 2026

(54) NEMATOSTATIC COMPOSITIONS, AND USE THEREOF IN AGRICULTURE

(71) Applicant: AGRO INNOVATION INTERNATIONAL, Saint-Malo (FR)

(72) Inventors: Jean-Claude Yvin, Saint-Malo (FR); Florence Cruz, Saint-Malo (FR)

(73) Assignee: AGRO INNOVATION INTERNATIONAL, Saint-Malo (FR)

( * ) Notice: Subject to any disclaimer, the term of this patent is extended or adjusted under 35 U.S.C. 154(b) by 853 days.

(21) Appl. No.: 17/769,413

(22) PCT Filed: Oct. 16, 2020

(86) PCT No.: PCT/FR2020/051858

§ 371 (c)(1),
(2) Date: Apr. 15, 2022

(87) PCT Pub. No.: WO2021/074546

PCT Pub. Date: Apr. 22, 2021

(65) Prior Publication Data

US 2025/0275541 A1 Sep. 4, 2025

(30) Foreign Application Priority Data

Oct. 16, 2019 (FR) ...................................... 1911537

(51) Int. Cl.

*A01N 65/03* (2009.01)
*A01N 37/02* (2006.01)
*A01P 5/00* (2006.01)

(52) U.S. Cl.

CPC ............. *A01N 65/03* (2013.01); *A01N 37/02* (2013.01); *A01P 5/00* (2021.08)

(58) Field of Classification Search

CPC ...................................................... A01N 65/03
See application file for complete search history.

(56) References Cited

U.S. PATENT DOCUMENTS

| | | | | |
|---|---|---|---|---|
| 2012/0015809 A1* | 1/2012 | He | A01N 37/02 504/142 |
| 2019/0021324 A1* | 1/2019 | O'Sullivan | A01N 31/02 |

FOREIGN PATENT DOCUMENTS

| | | | | |
|---|---|---|---|---|
| CN | 106085449 A * | 11/2016 | C09K 17/40 |
| CN | 106173288 A | 12/2016 | |
| CN | 107616307 A * | 1/2018 | |
| JP | H01279814 A * | 11/1989 | |
| WO | 2010/096358 A2 | 8/2010 | |
| WO | 2010/096358 A3 | 8/2010 | |
| WO | 2014/147199 A1 | 9/2014 | |
| WO | WO-2017032954 A1 * | 3/2017 | A01N 25/12 |
| WO | 2019/095002 A1 | 5/2019 | |
| WO | 2019/095002 A8 | 5/2019 | |

OTHER PUBLICATIONS

International Search Report for International Application No. PCT/FR2020/051858 Mailed on Jan. 25, 2021, 5 pages.
Author Unknown, The Lifting Eye Serum, Max Huber Research Labs, XP-002768945, Feb. 2016, 5 pages.

* cited by examiner

*Primary Examiner* — Gina C Justice
(74) *Attorney, Agent, or Firm* — MH2 Technology Law Group, LLP

(57) ABSTRACT

The invention relates to nematostatic compositions comprising (i) a marine alga or a marine alga extract and (ii) a carboxylic acid, preferably selected from formic acid, acetic acid, lactic acid, citric acid, oxalic acid, propionic acid and malic acid, preferably formic acid; and use thereof.

18 Claims, 7 Drawing Sheets

| | | | | | | | |
|---|---|---|---|---|---|---|---|
| | 0 | 20,0 | 42,0 | 66,0 | 88,0 | 114,0 | 160,0 |
| H2O | 0 | 100,0 | 100,0 | 100,0 | 100,0 | 100,0 | 100,0 |
| FP | 0 | 0,0 | 0,0 | 0,2 | 0,2 | 0,2 | 0,2 |
| F200 | 0 | 4,5 | 28,9 | 87,1 | 88,7 | 91,0 | 91,4 |
| F200+RD2 | 0 | 2,66 | 3,59 | 49,77 | 62,54 | 66,22 | 66,82 |
| RD2 | 0 | 73,7 | 76,0 | 87,0 | 87,9 | 88,5 | 88,9 |

| | 0 | 20,0 | 42,0 | 66,0 | 88,0 | 114,0 | 160,0 |
|---|---|---|---|---|---|---|---|
| H2O | 0 | 100,0 | 100,0 | 100,0 | 100,0 | 100,0 | 100,0 |
| FP | 0 | 0,0 | 0,0 | 0,2 | 0,2 | 0,2 | 0,2 |
| ACA | 0 | 52,1 | 59,6 | 87,7 | 94,8 | 96,8 | 97,7 |
| ACA+RD2 | 0 | 56,4 | 56,5 | 64,6 | 73,9 | 75,5 | 75,5 |
| RD2 | 0 | 73,7 | 76,0 | 87,0 | 87,9 | 88,5 | 88,9 |

| | | | | | | | |
|---|---|---|---|---|---|---|---|
| | 0 | 20,0 | 42,0 | 66,0 | 88,0 | 114,0 | 160,0 |
| H2O | 0 | 100,0 | 100,0 | 100,0 | 100,0 | 100,0 | 100,0 |
| FP | 0 | 0,0 | 0,0 | 0,2 | 0,2 | 0,2 | 0,2 |
| FNA | 0 | 24,3 | 51,2 | 79,3 | 87,4 | 96,2 | 102,3 |
| FNA+RD2 | 0 | 5,5 | 9,0 | 48,3 | 54,1 | 55,6 | 57,3 |
| RD2 | 0 | 73,7 | 76,0 | 87,0 | 87,9 | 88,5 | 88,9 |

| | 0 | 20,0 | 42,0 | 66,0 | 88,0 | 114,0 | 160,0 |
|---|---|---|---|---|---|---|---|
| H2O | 0 | 100,0 | 100,0 | 100,0 | 100,0 | 100,0 | 100,0 |
| FP | 0 | 0,0 | 0,0 | 0,2 | 0,2 | 0,2 | 0,2 |
| ACT | 0 | 8,6 | 11,2 | 72,2 | 75,9 | 77,2 | 77,7 |
| ACT+RD2 | 0 | 1,3 | 1,2 | 8,2 | 23,1 | 30,9 | 38,4 |
| RD2 | 0 | 73,7 | 76,0 | 87,0 | 87,9 | 88,5 | 88,9 |

NEMATOSTATIC COMPOSITIONS, AND USE THEREOF IN AGRICULTURE

CROSS REFERENCE TO RELATED APPLICATIONS

This application is a U.S. National Stage Application of PCT/FR2020/051858 filed 16 Oct. 2020, which claims priority to French Patent Application No. 1911537 filed on 16 Oct. 2019, the entire disclosures of which are hereby incorporated by reference in their entireties.

TECHNICAL FIELD

The invention relates to a nematostatic composition comprising a marine alga or a marine alga extract and a carboxylic acid, which may be used in particular in agriculture for combating attacks by nematodes.

PRIOR ART

Nematodes are vermiform animals, generally microscopic. They occur in practically all environments, both in the form of parasites or as free organisms. The plant-parasitic nematodes are capable of causing significant damage to cultivated plants and are extremely widespread.

Because they are difficult or impossible to observe in the field, and because more generally their symptoms are non-specific, the damage that nematodes inflict on crops is most often attributed to other more visible causes. Farmers and researchers often underestimate their effects. However, it is generally recognized that plant-parasitic nematodes reduce world agricultural production by approximately 11%, or a loss of harvests of several million tonnes each year, corresponding to an economic cost estimated on the world scale at 100 billion dollars per year.

The nematodes are of global distribution and are present in the surface layers of the soil. They are adapted to every type of environment: salt water, fresh water, from the polar regions to the tropical regions. They constitute the animal group that is the most numerous and the most widespread in the soil. Their larvae can remain alive for decades in the form of cysts.

There are many means for combating these phytopathogens but they are sometimes difficult to implement or only partially effective. Besides chemical nematicides or biofumigation, techniques for physical treatment (solarization) and observance of agricultural practices, possible new methods for combating them are: supplying the soil with biological organisms that are natural predators of nematodes, genetic improvement of plants to make them resistant to these pathogens, or natural stimulation of plant defenses by elicitors.

Fumigation products are the traditional means of control of nematodes especially in the USA, France, Japan, Italy and Spain and represent 45% of sales of nematicides. However, they are expensive and are therefore limited to high-value crops.

Chemical nematicides represented 55% of total sales in 2011, and are the most used in Brazil, UK, Mexico, South Africa, China and Argentina.

In Europe, the crops most affected by infection with nematodes are field crops (beets, maize, hard wheat and colza), vegetable crops (carrot, potato, Solanaceae, Cucurbitaceae, lettuces) and perennial crops such as grapevine.

For environmental and health reasons, almost all of the most effective nematicides have been or will be withdrawn from the market, leaving the industry with few solutions.

In this context of reduction of the use of pesticides and the emergence of so-called "virulent" nematodes capable of circumventing the current resistance of plants, it is therefore essential to find alternative methods.

SUMMARY OF THE INVENTION

Thus, the present invention, which finds application in the agro-ecological and agricultural area, aims to propose a new nematostatic composition for combating attacks by nematodes.

According to a first aspect, the invention relates to a nematostatic composition comprising (i) a marine alga or a marine alga extract and (ii) a carboxylic acid, preferably selected from formic acid, acetic acid, lactic acid, citric acid, oxalic acid, propionic acid and malic acid, preferably formic acid.

According to a second aspect, the invention relates to the use of a composition according to the invention as a nematostatic composition against nematodes.

According to a third aspect, the invention relates to a method of soil treatment intended to promote growth of a plant by reducing nematodes' access to the roots of said plant, characterized in that it comprises supplying the soil with an effective amount of a composition according to the invention.

DETAILED DESCRIPTION

Definitions

The term "nematostatic composition" denotes a composition that disturbs recognition of its host plant by a nematode, which blocks development of the nematode egg or larva and/or which paralyzes the nematode temporarily.

The term "marine alga" denotes a thallophyte living in an aquatic environment, and more precisely in seas and oceans, usable in agriculture, the food industry, and industry in general. In the context of the present invention, the marine alga may be a brown alga, a green alga, a red alga, and preferably a brown alga. Advantageously, the marine alga used in the context of the invention is a brown alga selected from *Ascophyllum nodosum*, *Fucus serratus*, *Fucus vesiculosus*, *Laminaria hyperborea*, *Laminaria saccharina*, *Laminaria digitata*, *Laminaria japonica*, *Ecklonia maxima*, *Macrocystis pyrifera*, *Himanthalia elongata* and *Sargassum* spp, preferably *Ascophyllum nodosum*.

The term "extract" denotes the product resulting from extraction from a source. For example, the source may be a biological source, such as cells. In the case of cells, the term "extract" therefore denotes the product resulting from extraction of the contents of cells. Thus, for example, the term "marine alga extract" denotes the product resulting from extraction of the contents of the cells of a marine alga. Extraction may be carried out with an aqueous solvent or an organic solvent.

The term "carboxylic acid" is to be understood in its usual sense, i.e. an acid of formula R—COOH, where R is a hydrogen or an organic group, advantageously R is a hydrogen or an organic group comprising between 1 and 10 carbon atoms. In the context of the present invention, the carboxylic acid may be selected from methanoic acid, ethanoic acid, acetic acid, propanoic acid, butanoic acid, pentanoic acid, hexanoic acid, heptanoic acid, octanoic acid, nonanoic acid, decanoic acid, benzoic acid, 2-hydroxybenzoic acid, 2-mercaptopropanoic acid. In a preferred embodiment, the carboxylic acid is selected from formic acid, acetic acid, lactic acid, citric acid, oxalic acid, propionic acid, malic acid, tartaric acid, fumaric acid, gluconic acid, sorbic acid and butyric acid, preferably a carboxylic acid selected from the carboxylic acids is selected from formic acid, acetic acid and lactic acid. In a particularly preferred embodiment, the carboxylic acid is formic acid.

The term "fertilizer" denotes a substance, or a mixture of substances, natural or of synthetic origin, used in agriculture, in horticulture and sylviculture, for improving soils, in particular their structure, and for fertilizing cultivated plants. The fertilizers comprise fertilizers and amendments.

The term "fertilizer" denotes a fertilizing substance whose main function is to supply plants with elements that are directly useful to their nutrition (major fertilizing elements, secondary fertilizing elements and trace elements).

The term "amendment" denotes a substance intended to improve soil quality, and in particular intended to improve soil pH. Advantageously, the amendment is selected from the basic mineral amendments of the limestone type and/or limestone and magnesia; the humus-bearing amendments such as compost or dung.

The expression "plant" means, in the present application, the plant considered in its entirety, including its root system, its vegetative system, seeds and fruits.

The present invention arises from the surprising advantages demonstrated by the inventors, of the effect that a composition comprising a marine alga or a marine alga extract and an organic acid has on nematodes.

Composition

The invention relates to a nematostatic composition comprising (i) a marine alga or a marine alga extract and (ii) a carboxylic acid, preferably selected from formic acid, acetic acid, lactic acid, citric acid, oxalic acid, propionic acid, malic acid, tartaric acid, fumaric acid, gluconic acid, sorbic acid and butyric acid, preferably formic acid.

Marine algae can easily be harvested by the conventional methods described in the literature. Marine algae can be dried to remove water so as to obtain dry algae, i.e. algae containing less than 5% water, preferably less than 3% water, relative to the total weight of algae. Drying makes it possible to obtain marine algae in the dry form. Marine algae may also be ground, for example before or after drying.

The marine algae extracts may be obtained by a method comprising the following steps: mixing the fresh or dry algae, preferably ground, with water, extraction (solid-liquid separation) and optionally fractionation and/or concentration.

In a particular embodiment, the marine alga extract is a macerated product of macroalgae. In this embodiment, the marine alga extract is obtained by aqueous maceration by mixing the previously dried algae (dry algae) with water at a suitable temperature and for a suitable time. For example, the dry marine algae are mixed with water at ambient temperature for 3 hours, and the mixture is then centrifuged to recover the liquid fraction therefrom. The liquid fraction may be used as it is as marine alga extract, or may undergo one or more further treatments, for example such as filtration and/or precipitation. The marine alga extract may be dried to remove the water therefrom in order to obtain a dry extract, i.e. an extract containing less than 5% water, preferably less than 3% water, relative to the total weight of the extract. Drying makes it possible to obtain a marine alga extract in dry form.

In a particular embodiment of the invention, the marine alga or the marine alga extract is in the dry form, preferably in powder form.

Algae powder may be obtained by drying an alga and then grinding it until a powder is obtained.

Advantageously, the particle size of the powder of alga or of the alga extract is characterized by the following parameters:

- a volumetric distribution dv50 less than 100 μm, preferably less than 90 μm, 80 μm, 70 μm, 60 μm, for example from 30 to 100 μm, preferably from 30 to 80 μm, from 50 to 60 μm, preferably of about 55 μm and/or
- a volumetric distribution dv90 less than 315 μm, preferably less than 250 μm, less than 200 μm, for example from 100 to 315 μm, preferably from 150 to 200 μm, preferably of about 180 μm.

In the context of the present invention, the carboxylic acid is preferably selected from formic acid, acetic acid, lactic acid, citric acid, oxalic acid, propionic acid, malic acid, tartaric acid, fumaric acid, gluconic acid, sorbic acid and butyric acid, preferably a carboxylic acid selected from the carboxylic acids is selected from formic acid, acetic acid and lactic acid. In a particularly preferred embodiment, the carboxylic acid is formic acid. The carboxylic acid may be obtained by chemical synthesis or by fermentation according to methods well described in the literature.

Advantageously, the carboxylic acid is in the form of a salt; preferably it is in powder form. The salt of carboxylic acid included in the composition according to the invention may be selected from a salt of an alkali metal, such as sodium, potassium or lithium; a salt of an alkaline earth metal, such as calcium or magnesium; a salt of a transition metal, such as manganese, copper, zinc or iron; an ammonium salt; a phosphonium salt or a sulfonium salt. Preferably, the salt is selected from an ammonium salt, a potassium salt, a calcium salt and a sodium salt. For example, when the carboxylic acid is formic acid, the salt may be selected from calcium formate, sodium formate, potassium formate or ammonium formate. As another example, when the carboxylic acid is acetic acid, the salt may be selected from calcium acetate, sodium acetate and potassium acetate. The carboxylic acid in the form of salt is particularly advantageous as it makes it easy to obtain a powder that can be granulated easily.

The carboxylic acid is advantageously in the dry form, preferably in powder form.

Advantageously, the particle size of the carboxylic acid powder is characterized by the following parameters:

- a volumetric distribution dv50 less than 100 μm, preferably less than 90 μm, 80 μm, 70 μm, 60 μm, for example from 30 to 100 μm, preferably from 30 to 80 μm, from 50 to 60 μm, preferably of about 55 μm and/or
- a volumetric distribution dv90 less than 315 μm, preferably less than 250 μm, less than 200 μm, for example from 100 to 315 μm, preferably from 150 to 200, preferably of about 180 μm.

The composition according to the invention may be in the form of homogeneous powder comprising a marine alga in powder form or a marine alga extract in powder form and a carboxylic acid in powder form.

When the marine alga or the marine alga extract and the carboxylic acid are in powder form, they can be mixed homogeneously. The granulometry of each of the powders is adjusted so as to be able to mix them and obtain a homogeneous mixture of powders. Advantageously, the granulometries of the marine alga or marine alga extract and of the carboxylic acid are equivalent so as to be able to obtain a homogeneous powder.

In a particular embodiment, the composition further comprises at least one fertilizer. Compositions of this kind make it possible to respond best to the growth requirements of the plant, which will be expressed in particular in terms of improvement of the development of the plant and of the yield.

As examples of fertilizers usable in the composition according to the invention, we may mention limestone amendments, organic amendments and growing substrates, root fertilizers such as NP, PK, NPK, etc., or else root nutrient solutions.

In a particular embodiment, the fertilizer is one substance or a mixture of several substances selected from urea, ammonium sulfate, ammonium nitrate, phosphate, phosphate salts, potassium chloride, magnesium nitrate, manganese nitrate, zinc nitrate, copper nitrate, phosphoric acid, potassium nitrate, potassium sulfate, calcium sulfate, calcium chloride and boric acid.

The fertilizer may be in solid form, preferably in the form of granules, or in powder form.

When the fertilizer is in the form of granules, it may be combined with (i) a marine alga in powder form or a marine alga extract in powder form and a carboxylic acid in powder form or (ii) granules obtained from a homogeneous powder of a marine alga or of a marine alga extract and of a carboxylic acid.

When the fertilizer is in powder form, the particle size of the fertilizer powder may be characterized by the following parameters:

- a volumetric distribution dv50 less than 100 μm, preferably less than 90 μm, 80 μm, 70 μm, 60 μm, for example from 30 to 100 μm, preferably from 30 to 80 μm, from 50 to 60 μm, preferably of about 55 μm and/or
- a volumetric distribution dv90 less than 315 μm, preferably less than 250 μm, less than 200 μm, for example from 100 to 315 μm, preferably from 150 to 200, preferably of about 180 μm.

When the composition comprises a marine alga in powder form or a marine alga extract in powder form, a carboxylic acid in powder form and a fertilizer in powder form, they can easily be mixed to obtain a homogeneous powder. Thus, the granulometry of each of the powders is adjusted so as to be able to mix them and obtain a homogeneous mixture of powders. Advantageously, the granulometries of the marine alga or marine alga extract, of the carboxylic acid and of the fertilizer are equivalent so as to be able to obtain a homogeneous powder.

In a particular embodiment, when the composition comprises a marine alga or a marine alga extract, a carboxylic acid and a fertilizer, for example a fertilizer, the content of marine alga or of marine alga extract and of carboxylic acid is between 1% and 10%, for example between 1% and 5%, for example 1.5%, by weight relative to the total weight of the composition.

An example of a composition according to the invention comprises:

- between 20% and 30%, for example 25%, by weight of urea relative to the total weight of the composition,
- between 10% and 25%, for example 17%, by weight of ammonium sulfate relative to the total weight of the composition,
- between 25% and 35%, for example 30%, by weight of a source of $P_2O_5$, for example of TSP (triple superphosphate), relative to the total weight of the composition,
- between 10% and 20%, for example 16%, by weight of a source of $K_2O$, for example of potassium chloride relative to the total weight of the composition,
- between 1% and 10%, for example 1.5%, by weight of a mixture of calcium formate and of alga extract relative to the total weight of the composition,
- between 5% and 15%, for example 9.5%, by weight of calcium carbonate relative to the total weight of the composition, and
- between 0.2% and 1%, for example 0.5%, by weight of granulation aid relative to the total weight of the composition.

The composition according to the invention may be in the form of granules. The granules may be obtained by the methods described in the literature, for example by compression, prilling, dry granulation or wet granulation. The size of the granules is generally of the order of 1 to 5 mm.

In a particularly preferred embodiment, the content of carboxylic acid is in the range from 30 to 90 wt % and the content of alga or of alga extract is in the range from 10 to 70 wt %, relative to the total weight of the composition.

An example of a composition according to the invention comprises 35 wt % of carboxylic acid and 50 wt % of marine alga or of marine alga extract, relative to the total weight of the composition. In this example, when the carboxylic acid is calcium formate, said composition comprises 50 wt % of calcium formate, relative to the total weight of the composition (knowing that calcium formate comprises 70 wt % of formic acid and 30 wt % of calcium).

Another example of a composition according to the invention comprises 50 wt % of carboxylic acid and 30 wt % of marine alga or of marine alga extract, relative to the total weight of the composition. In this example, when the carboxylic acid is calcium formate, said composition comprises 70 wt % of calcium formate, relative to the total weight of the composition (knowing that calcium formate comprises 70 wt % of formic acid and 30 wt % of calcium).

The nematostatic composition according to the invention makes it possible to protect plants against nematodes. This protection makes it possible to improve plant health, thus responding to the needs of crop growth, which will be expressed in particular in terms of improvement of harvest yield and quality. The composition according to the invention also makes it possible to limit, and even eliminate, the use of pesticides.

Use and Method

The invention also relates to the use of a composition according to the invention as a nematostatic composition against nematodes, as well as a method of soil treatment intended to promote the growth of a plant by reducing nematodes' access to the roots of said plant, characterized in that it comprises supplying the soil with an effective amount of a composition according to the invention.

"Effective amount" means an amount sufficient to have a nematostatic effect of at least 10%, advantageously of at least 20%, for example of at least 30%, of at least 50% or of at least 70%. The nematostatic effect can be measured with the gall index. Thus, in the context of the present invention, an "effective amount" makes it possible to reduce the gall index by at least 10%, advantageously by at least 20%, for example by at least 30%, by at least 50% or by at least 70%.

Thus, in a particular embodiment, the composition according to the invention is supplied to the soil in an amount sufficient to have a nematostatic effect of at least 10%, advantageously of at least 20%, for example of at least 30%, at least 50% or at least 70%; for example to reduce the gall index by at least 10%, advantageously by at least 20%, for example by at least 30%, by at least 50% or by at least 70%.

Advantageously, the composition is supplied to the soil at the seedling stage, pre-emergence of the plant or post-emergence of the plant.

The composition according to the invention may be supplied to the soil in amounts varying according to the needs of the plant treated, for example in an amount from 1 to 50 kg/ha, preferably from 2 to 30 kg/ha, preferably about 10 kg/ha.

The present invention finds application in the treatment of a very great variety of plants.

Among the plants treated, we may mention in particular:

(i) dicotyledons such as Solanaceae (e.g. tobacco, tomatoes, potatoes, aubergines, etc.), Chenopodiaceae (e.g. sugar beets, etc.), Fabaceae (e.g. soybean, pea, alfalfa etc.), Cucurbitaceae (e.g. melon, watermelon, cucumber, marrows, etc.), Cruciferae or Brassicaceae (e.g. colza, mustard, etc.), Compositae (e.g. chicory, etc.), Umbelliferae (e.g. carrots, cumin etc.), Malvaceae (e.g. cotton plant, cacao, okra, etc.), Lamiaceae (lavender, etc.) and Rosaceae in particular trees and shrubs whose fruits are of economic importance; and (ii) monocotyledons such as for example cereals (e.g. wheat, barley, oat, rice, maize etc.) and the Liliaceae (e.g. onion, garlic, etc.).

Advantageously, the plant belongs to the order of the monocotyledons, such as the Poaceae family. The Poaceae, commonly called grasses, include in particular most of the species commonly called "grasses" and "cereals". Cereals are widely cultivated, principally for their grains, and are used for human and animal food.

When the plant is from the Poaceae family, it is preferably selected from wheat, rice, barley, oat, rye, sugar cane, pasture grass or maize, preferably wheat.

The plant is preferably selected from soybean, beet, maize, hard wheat, colza, carrot, potato, the Solanaceae, the Cucurbitaceae, lettuce or grapevine.

The nematodes treated according to the use or the method of the invention are preferably pathogenic nematodes, for example selected from the genera *Achlysiella, Anguina, Aphasmatylenchus, Aphelenchoides, Belonolaimus, Bursaphelenchus, Criconemella, Ditylenchus, Helicotylenchus, Hemicriconemoides, Heterodera, Hirschmanniella, Hoplolaimus, Longidorus, Meloidogyne, Nacobbus, Paralongidorus, Pratylenchus, Radopholus, Rotylenchulus, Rotylenchus, Scutellonema, Trichodorus, Trophotylenchulus, Tylenchorhynchus, Tylenchulus* and *Xiphinema.*

EXAMPLES

Example 1: Nematostatic Effect In Vitro

Figure 1:
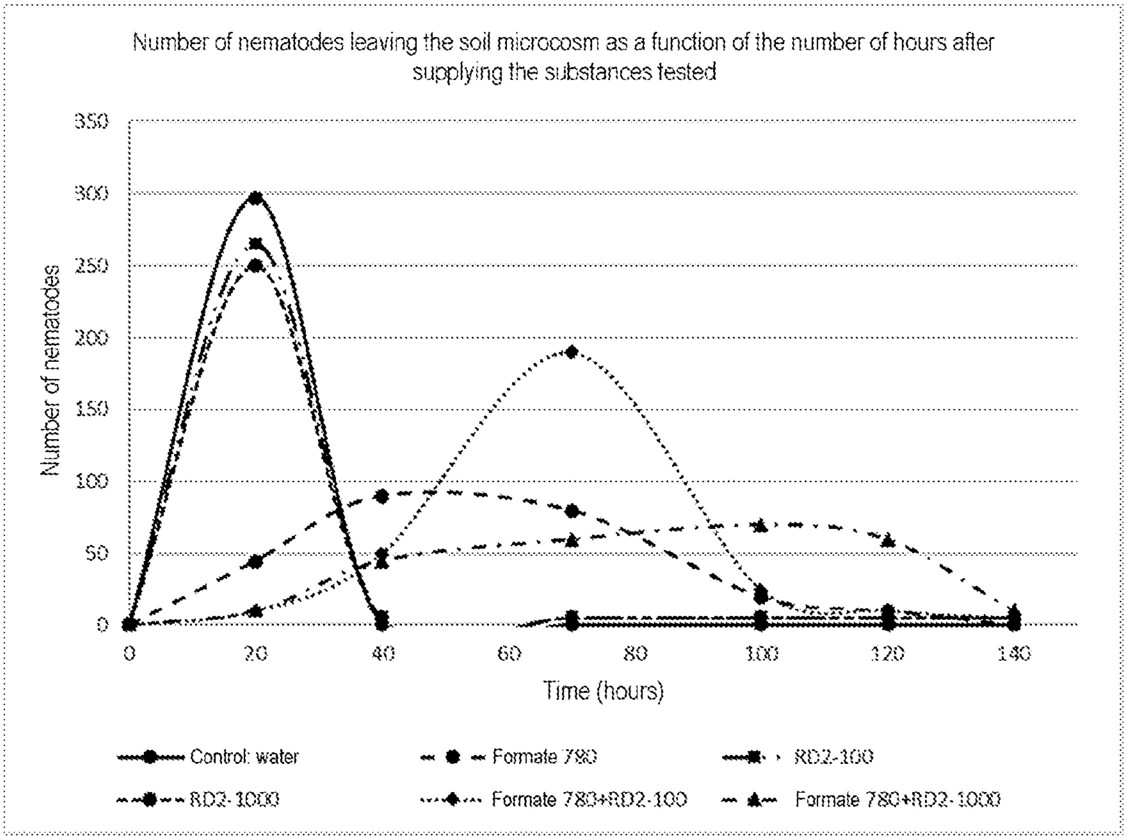
FIG. 1 shows the number of nematodes migrating from the soil to the water through the sieve as a function of the time after contact with the products tested. This figure therefore illustrates the mobility of the nematodes treated or not treated with a composition according to the invention.

Method for Testing the Mobility of *Meloidogyne javanica* in the Soil Microcosm Juvenile nematodes of *M. javanica* were deposited on the surface of a column of sterile soil 2 cm thick resting on a sieve (cotton wool), 1 hour before adding the test products in order to allow them time to move in the porosity of the soil. The nematodes will be distributed randomly in the layer of soil, depending on their mobility. After adding the test products and incubating for 6 h, the column of soil and the sieve were placed in a tube containing water. The mobile nematodes pass through the column of soil and migrate naturally into the water. The nematodes passing into the water can be counted.

If the concentration of test product considered is inhibitory for the mobility of the nematodes in the presence of soil, the nematodes are kept in the column of soil and delayed in their migration into the water. The time for emergence of the nematodes from the column of soil is longer as the concentration of nematostatic product increases.

The concentration of test product is considered inhibitory when the number of mobile nematodes in the presence of the test product is significantly lower than the number of mobile nematodes in the presence of water (negative control).

Experimental Conditions

1) Variants:

in the following examples "ppm" corresponds to "mg/kg of soil"

Salt of carboxylic acid (calcium formate) at the concentration in the soil expressed in mg/kg of soil: 780 mg/kg of soil (or ppm).

Algae powder RD2 (*Ascophyllum nodosum*) at the concentrations in the soil expressed in mg/kg of soil: 100 mg/kg of soil or 1000 mg/kg of soil.

Composition of salt of carboxylic acid (calcium formate) at 780 mg/kg of soil+algae powder RD2 (*Ascophyllum nodosum*) at 100 mg/kg of soil.

Composition of salt of carboxylic acid (calcium formate) at 780 mg/kg of soil+algae powder RD2 (*Ascophyllum nodosum*) at 1000 mg/kg of soil.

Negative control $H_2O$.

2) Number of repetitions/variant: 4 repetitions.

3) Nematodes: 297 nematodes±60/microcosm (i.e. soil+nematodes+product tested)

4) Conditions.

Room temperature (22° C.).

The soil that was used is a soil of sandy texture (79% sand; 14.1% loam; 6.9% clay), with a pH of 7.8 and a level of organic matter of 29.2 g/kg. The soil was sterilized by autoclaving (60 min at 105° C.) before being used.

Amount of soil: 4.04 g±0.03 g of soil per microcosm.

Height of column of soil: 2 cm.

Soil moisture 22%±0.6%.

Nematodes deposited 1 h before depositing the test product.

Incubation time with the test product: 6 h.

Active passage over water to test the reversibility of the effect over 6 days (kinetics over 144 h).

Results

Figure 2:
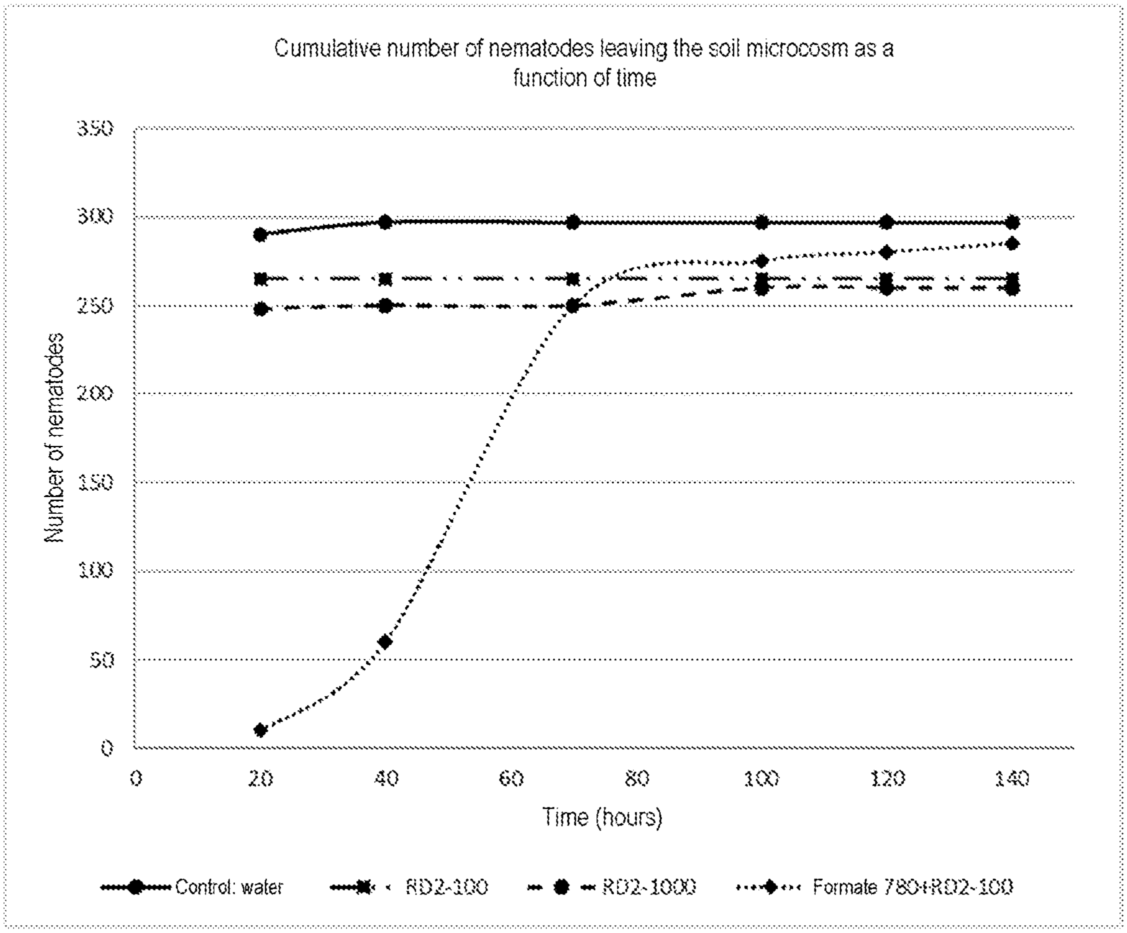
FIG. 2 shows the cumulative number of nematodes migrating from the soil to the water through the sieve as a function of time. This figure therefore illustrates the mobility of the nematodes treated or not treated with a composition according to the invention.
Figure 3:
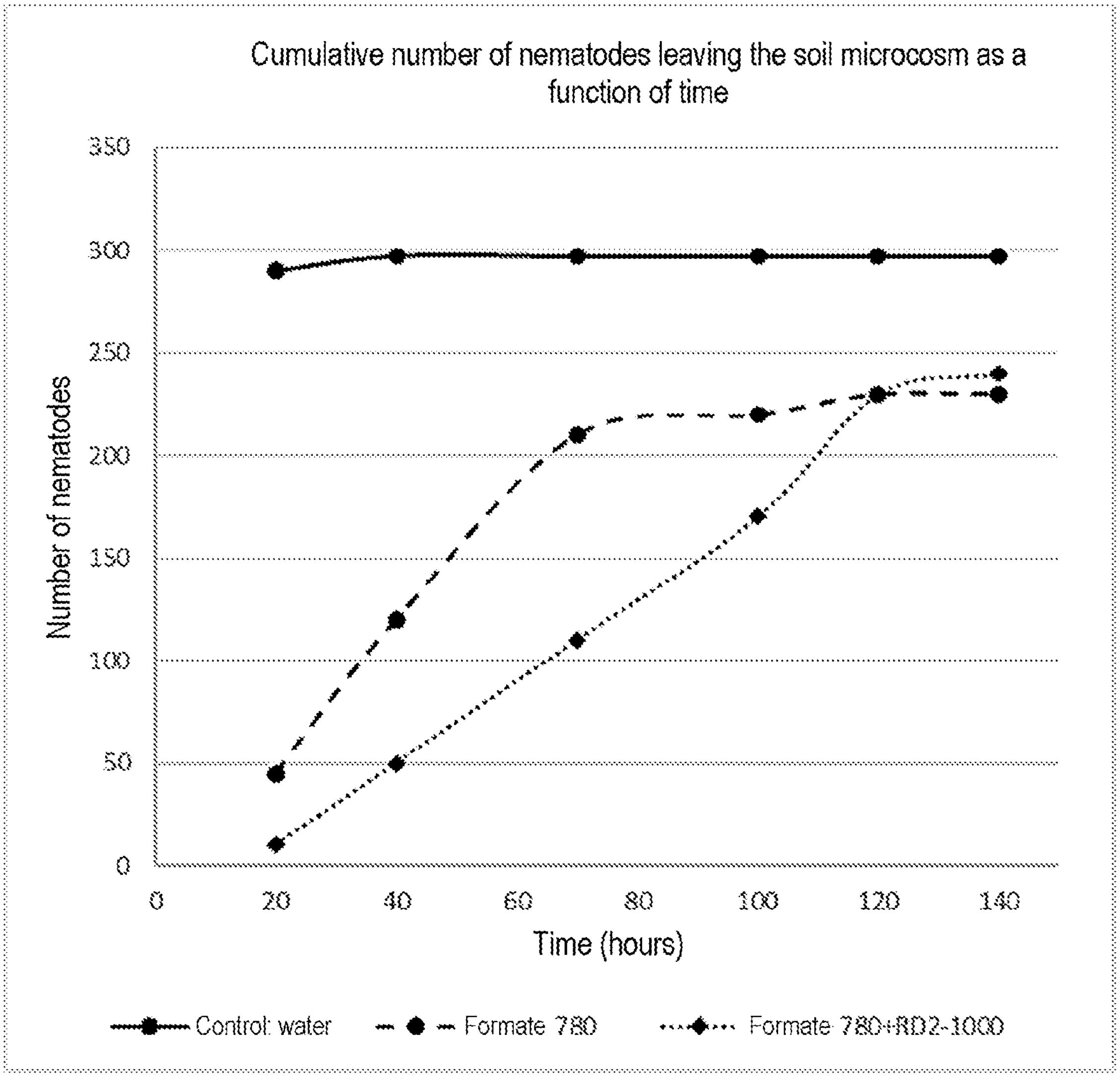
FIG. 3 shows the cumulative number of nematodes migrating from the soil to the water through the sieve as a function of time. This figure therefore illustrates the mobility of the nematodes treated or not treated with a composition according to the invention.
Figure 4:
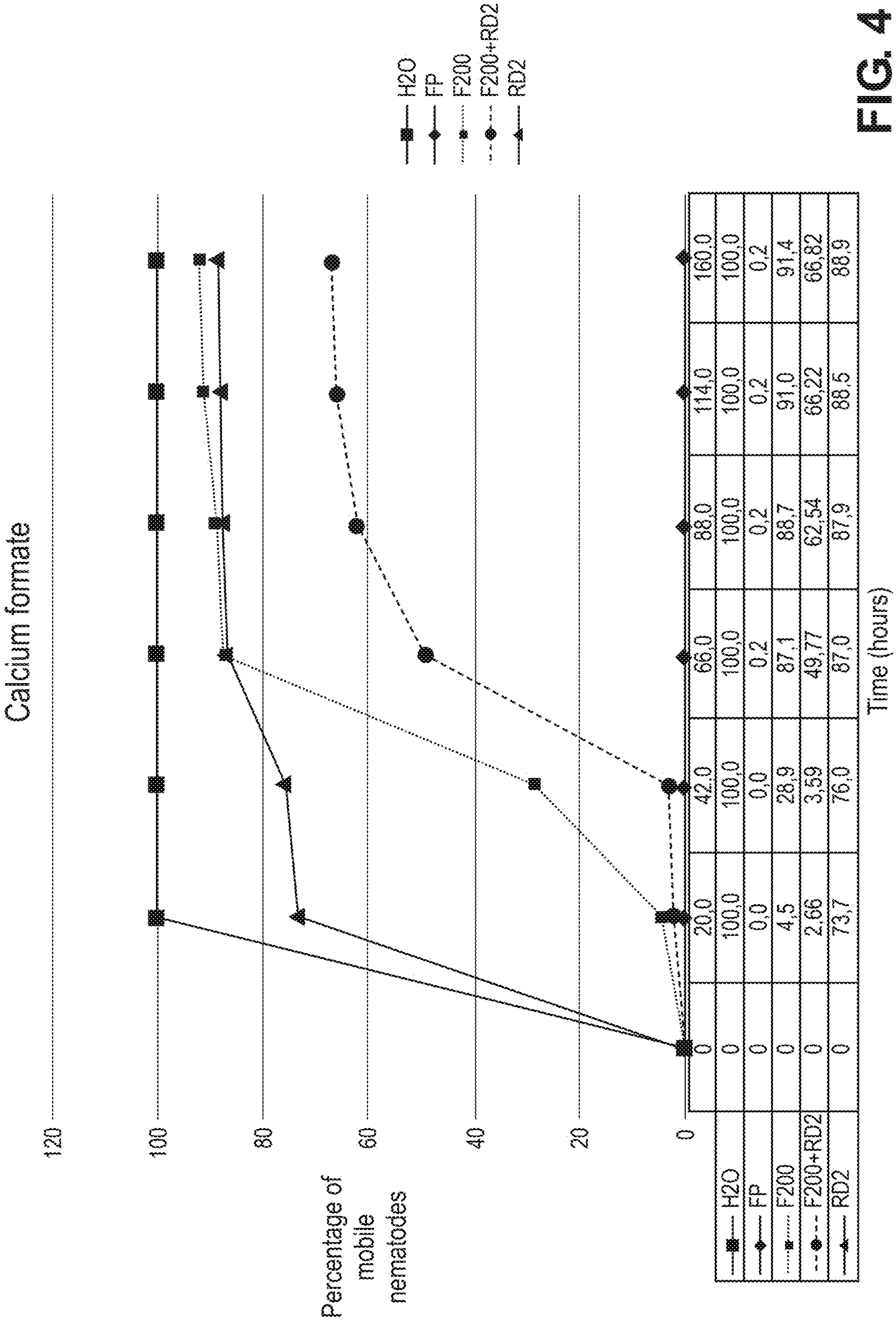
FIG. 4 shows the percentage of mobile nematodes migrating from the soil to the water through the sieve as a function of time, the nematodes being brought into contact with calcium formate (F200), an alga extract (RD2), a mixture F200+RD2, water ($H_2O$, negative control) or fluopyram (FP, positive control).
Figure 5:
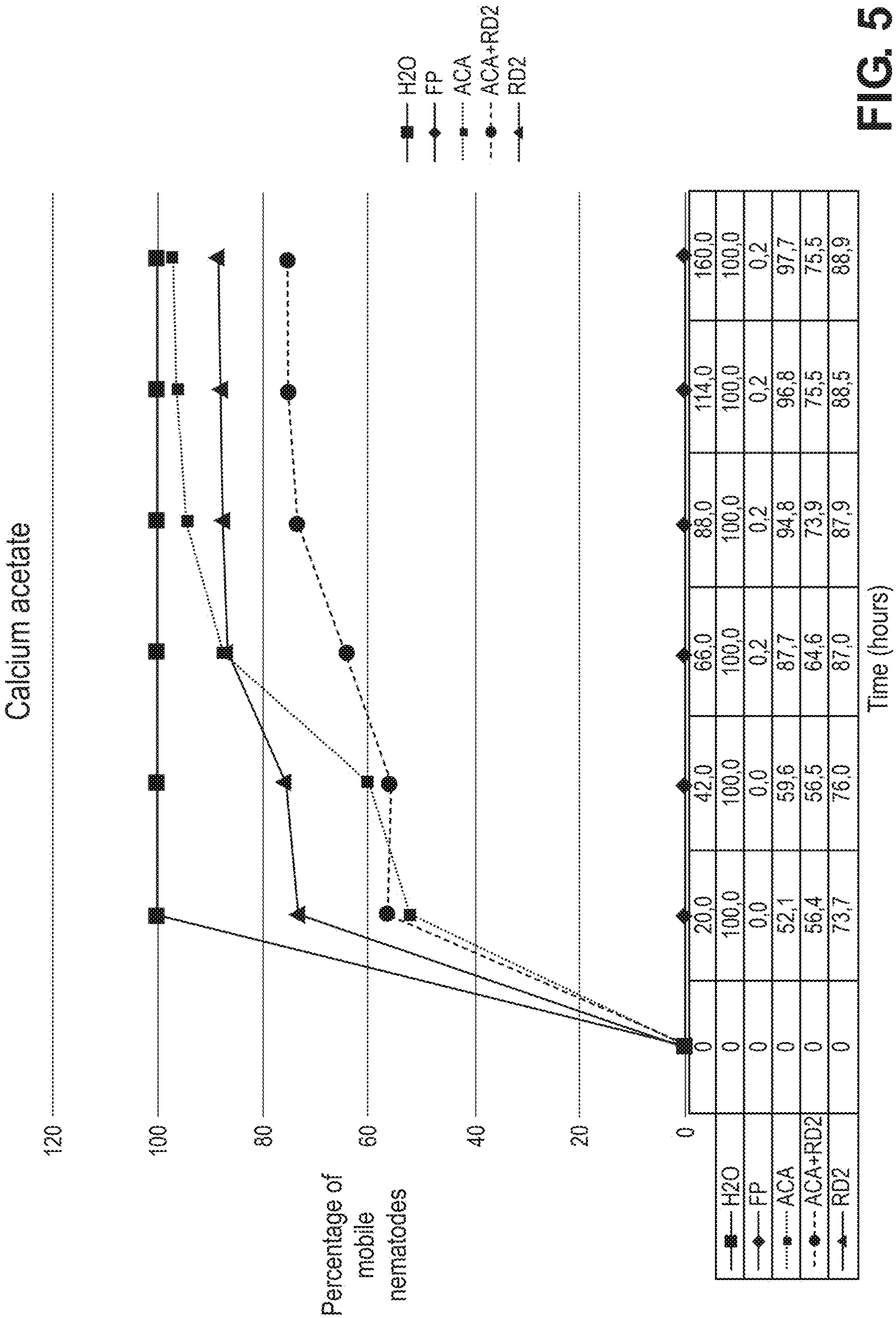
FIG. 5 shows the percentage of mobile nematodes migrating from the soil to the water through the sieve as a function of time, the nematodes being brought into contact with calcium acetate (ACA), an alga extract (RD2), a mixture ACA+RD2, water ($H_2O$, negative control) or fluopyram (FP, positive control).
Figure 6:
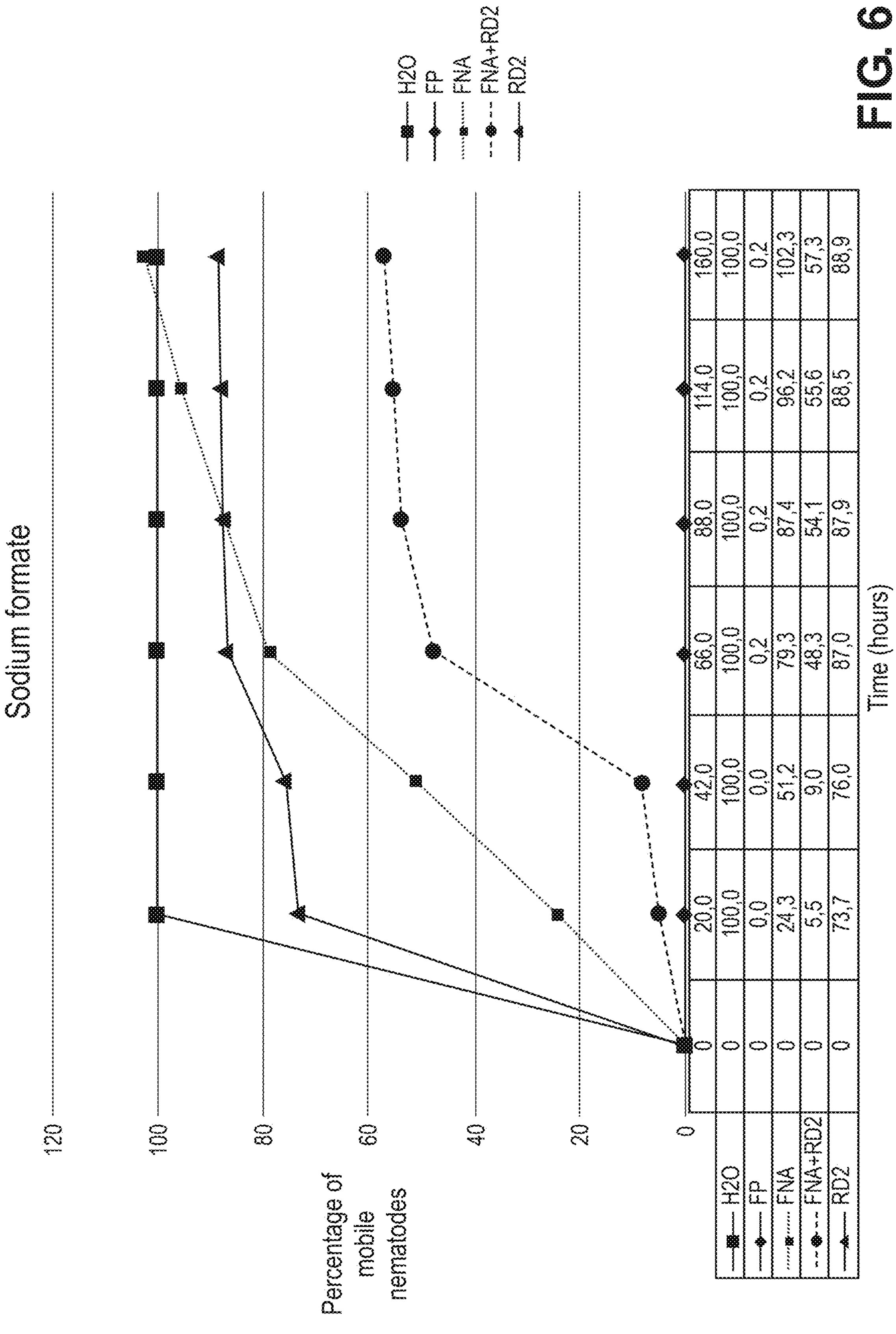
FIG. 6 shows the percentage of mobile nematodes migrating from the soil to the water through the sieve as a function of time, the nematodes being brought into contact with sodium formate (FNA), an alga extract (RD2), a mixture FNA+RD2, water ($H_2O$, negative control) or fluopyram (FP, positive control).
Figure 7:
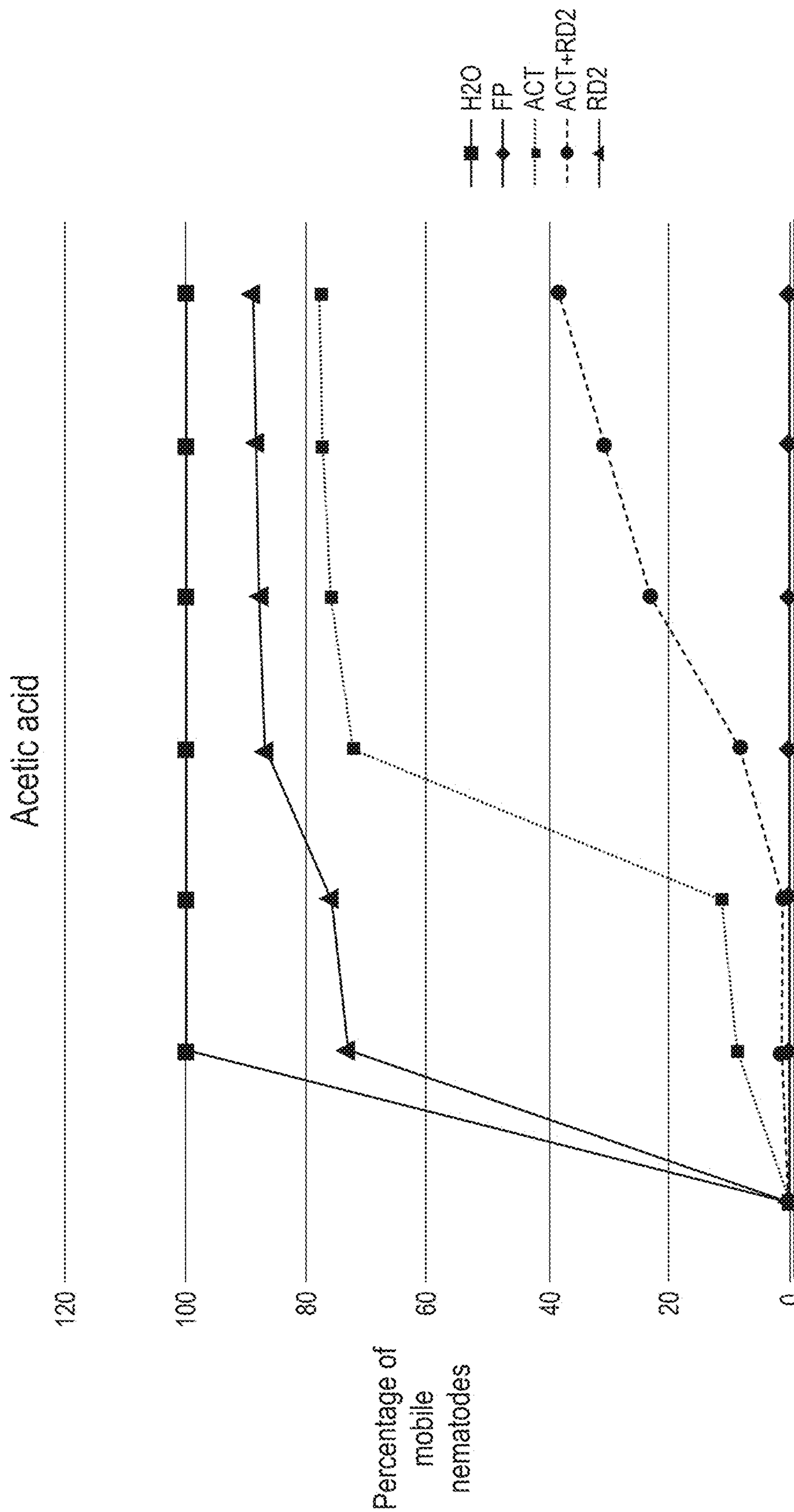
FIG. 7 shows the percentage of mobile nematodes migrating from the soil to the water through the sieve as a function of time, the nematodes being brought into contact with acetic acid (ACT), an alga extract (RD2), a mixture ACT+RD2, water ($H_2O$, negative control) or fluopyram (FP, positive control).

The results are presented in FIGS. 1 and 2.

In the presence of water and algae powder alone (RD2) at doses of 100 ppm and 1000 ppm in the experimental conditions tested, 97 to 99% of the nematodes left the microcosm of the soil in the first 20 hours.

In the presence of 780 ppm of calcium formate alone:

14% of the nematodes were not affected in their mobility,

62% of the nematodes were affected reversibly in their mobility. The juveniles of *M. javanica* took between 2 and 3 days to leave the soil microcosm, and 24% of the nematodes were affected irreversibly at 6 days.

In the presence of 780 ppm of calcium formate and algae powder RD2:

3 to 4% of the nematodes were not affected in their mobility, 77 to 93% of the nematodes were affected reversibly in their mobility. The juveniles of *M. javanica* take between 2 to 4 days (RD2 100 ppm) and between 2 to 5 days (RD2 1000 ppm) to leave the soil microcosm, and 20% of the nematodes were affected irreversibly at 6 days for the combination (calcium formate+RD2).

At 3 days, 92% of the nematodes that were placed in the presence of calcium formate 780 ppm alone left the microcosm, against 46% of the nematodes that were placed in the presence of calcium formate 780 ppm+RD2-1000 ppm. It is necessary to wait 5 days for 96% of the nematodes that were placed in the presence of calcium formate 780 ppm 30 RD2-1000 ppm to leave the microcosm.

The algae powder RD2 used alone did not affect the mobility of the nematodes in the soil. In contrast, more than 54% of the nematodes had reduced mobility, and for a longer time, when calcium formate and the algae powder were combined.

It has thus been shown that the inhibitory effect exerted by the composition on the mobility of *M. javanica* is reversible.

In the experimental conditions tested, the composition of the invention affected reversibly, whatever the concentration used, the kinetics of emergence and the number of nematodes capable of emerging from the column of soil. This demonstrates the nematostatic activity of the composition according to the invention.

The composition therefore has a nematostatic effect and can be used for repelling the nematodes from seedlings and/or young roots, for the time required for establishment and/or the start of growth of the plant.

Example 2: Nematostatic Effect In Vivo

The effect of the test product on the parasitic pressure exerted by a nematode *Meloidogyne javanica* on tomatoes in soil was tested.

The test of reduction of the parasitic pressure of *Meloidogyne javanica* on tomato in the presence of the test composition consisted of evaluating the potentially protective role of the composition with respect to the polyphagous endoparasitic nematode *Meloidogyne javanica* by a mechanism of immobilization of the juvenile nematodes.

The tests were carried out in pots containing sterilized soil and the composition supplied at the concentration to be tested. The tomatoes (variety Roma, sensitive to nematodes) were sown directly in the pots containing sterilized soil at the rate of 2 seedlings per pot. Fifteen days after sowing, a single seedling was retained and the nematodes *Meloidogyne javanica* were inoculated in the pots.

The kinetics of colonization of the tomato roots by the nematodes was recorded in order to measure whether the blocking effect of the composition occurs and is maintained over time in the soil.

The soil used is a soil of sandy texture (79% sand; 14.1% loam; 6.9% clay), with a pH of 7.8, and a level of organic matter of 29.2 g/kg of soil. It was sterilized by autoclaving (60 min at 105° C.) before being used in the experiments in order to destroy the nematodes potentially present naturally in this soil.

The pots used consist of PVC tubes 5 cm in diameter and 15 cm high, sealed at the bottom with a nylon cloth with mesh of 10 μm.

This device was selected for the low risk of inter-pot contamination that it presents, good confinement of the roots owing to the fine mesh of the cloth and a good nematodes/root system interface considering the small volume of soil.

Experimental Conditions

Composition

The composition tested in this experiment consisted of a mixture of powders made up of 50 wt % of calcium formate and 50 wt % of dry algae *Ascophyllum nodosum*. That is, a composition containing 35 wt % of formic acid, 15 wt % of calcium and 50 wt % of algae powder.

Variants:

Composition dose 1 in the soil+nematodes: 780 ppm (mg/kg of dry soil): 2 supplies 6 days apart (Fd1 N+).

Composition dose 2 in the soil+nematodes: 1200 ppm (mg/kg of dry soil): 1 supply (Fd2 N+).

Control, nematode-free water: A0 N0.

Control, water with nematodes (A0 N+).

Commercial nematicide (Vydate 10G marketed by Dupont and containing the nematicidal active substance Oxamyl) 20 kg/ha+nematodes (Vd1 N+).

Growth control, receiving the composition without nematode inoculation (to verify nontoxicity of the composition on a healthy plant): 1200 ppm (Fd2 N0).

Number of repetitions/variant: 5 repetitions

Nematodes: 288 nematodes±53/pot, or 1479 nematodes±272 nematodes/kg of dry soil. The suspension of nematodes contains synchronized juveniles: all aged 48 h at most.

Roma tomatoes aged 15 days at the time of inoculation.

Conditions:

Temperature: 22° C.

Amount of soil: 194.7±0.3 g of dry soil per pot.

Soil moisture at the time of inoculation: 22%.

Watering: there was no watering for the 2 first days, then moderate watering up to the 20th day. Starting from the 20th day, daily watering was carried out to maintain soil conditions at 22% moisture (determination of the volume of water to be supplied by weighing).

Supply of the substances:

Commercial nematicide 20 kg/ha: 3 mg/pot supplied in the form of a soil/product mixture at T−1, i.e. the day before inoculation with the nematodes.

Composition dose 1 (780 ppm): supply fractionated on two supply dates:

at T−1 (i.e. the day before inoculation with the nematodes): 152 mg of composition/pot supplied in solution (suspension of the powder in water).

at T+5: 152 mg of composition/pot supplied in solution (suspension of the powder in water).

Composition dose 2 (1200 ppm): supply made once at T−1 (i.e. the day before inoculation with the nematodes): 232.8 mg of composition/pot supplied in solution (suspension of the powder in water).

Depositing the nematodes: 1 day after depositing the test substances.

Test duration: 6 weeks (approximately one cycle of reproduction of *M. javanica*).

Measurements:

Method of counting the nematodes in the soil: the nematodes were removed from the soil (soil of the pot+rhizosphere soil obtained after rinsing the roots) by elutriation (separation of the nematodes from the other particles in the soil by density in a stream of water) followed by active passage through a cotton wool filter. The nematodes were then counted under a binocular magnifier (NF ISO 23611-4).

Method of counting the nematodes in the roots: the roots were recovered from the pots, rinsed and then cut up. The nematodes were extracted from the roots by active passage through a cotton wool filter for 5 days. The nematodes were then counted under a binocular magnifier.

Method of measurement of the gall index: The gall index is defined on the basis of the root system according to the Zeck scale (1971).

Results 14 days after inoculation with *M. javanica,* galls were observed on the A0 N+ seedlings (control seedlings inoculated only with the nematodes) at a level of about twenty galls per root system. The presence of these galls, 14 days after inoculation, is evidence of rapid infestation by the stage L2 juveniles of *M. javanica,* starting from the first few days after inoculation. No galls were detected for the other variants: A0 N0, Vd1 N+, Fd1 N+ (Negative control, Nematicide and Composition at a dose of 780 ppm). The 2 separate supplies of the composition translated into later penetration of the nematodes connected with immobilization of the nematodes in the soil.

Observation of the root systems of the tomato seedlings at T=42 days after inoculation showed absence of galls for the A0 N0 variant and the presence of galls for the 4 variants with nematodes.

The average number of galls present on the root system of the tomato seedlings of each variant is given in Table 1.

TABLE 1

| | Soil | Root | |
|---|---|---|---|
| Variants | Number of nematodes | Number of galls | Gall index |
| A0 N0 | 0 | 0 | 0 |
| Vd1 N+ | 2.6 ± 2.2 | 37.4 ± 14.5 | 1 |
| Fd1 N+ | 17.8 ± 8.2 | 68.8 ± 29.2 | 1-2 |
| Fd2 N+ | 8.4 ± 9.4 | 65.4 ± 31.4 | 2-3 |
| A0 N+ | 4.8 ± 1.6 | 115.2 ± 31.7 | 3-4 |

Count of the nematodes in the soil and gall index, 42 days after inoculation with *M. javanica*. The values correspond to the mean values of the 5 repetitions + standard deviations For the variants Commercial nematicide and Composition Fd1 N+ at 780 ppm, the average number of galls was 37.4±14.5 and 68.8±29.2, respectively. The galls were of small size. The gall index was from 1 to 2 in these variants.

In comparison with the control A0 N+, the composition supplied in 2 treatments (Fd1 N+) showed a larger number of nematodes remaining in the soil and a smaller number of nematodes that have infected the roots.

In the presence of the composition according to the invention, a gap of 14 days in the appearance of the galls on the roots of tomatoes was observed relative to the infested control. A number of galls less than 40% was also observed on the plants treated with the composition, relative to the infested control.

Example 3: Nematostatic Effect In Vitro of Different Carboxylic Acids

Method for Testing the Mobility of *Meloidogyne javanica* in the Soil Microcosm The method is identical to that described in Example 1.

Experimental Conditions

1) Variants:

| Test 1: without alga extract | | | | | | |
|---|---|---|---|---|---|---|
| Variants | F200 | ACA | FNA | AF | ACT | FP |
| Product, ppm (mg/kg of dry soil) | F200 780 | ACA 780 | FNA 780 | AF 780 | ACT 780 | Fluopyram 24 |

| Test 2: with alga extract | | | | | | |
|---|---|---|---|---|---|---|
| Variants | F200 + RD2 | ACA + RD2 | FNA + RD2 | AF + RD2 | ACT + RD2 | RD2 |
| Product, ppm (mg/kg of dry soil) | F200 780 | ACA 780 | FNA 780 | AF 780 | ACT 780 | |
| RD2 ppm (mg/kg of dry soil) | 780 | 780 | 780 | 780 | 780 | 780 |

Test 1: without alga extract

"ppm" corresponds to "mg/kg of soil".

Calcium formate (F200) at the concentration in the soil expressed in mg/kg of soil: 780 mg/kg of soil (or ppm).

Calcium acetate (ACA) at the concentration in the soil expressed in mg/kg of soil: 780 mg/kg of soil (or ppm).

Sodium formate (FNA) at the concentration in the soil expressed in mg/kg of soil: 780 mg/kg of soil (or ppm).

Acetic acid (ACT) at the concentration in the soil expressed in mg/kg of soil: 780 mg/kg of soil (or ppm).

Fluopyram (FP)—Positive control: Velum prime commercial nematicide,

Negative control $H_2O$.

Test 2: with alga extract (same variants as in test 1+algae powder RD2)

Algae powder (*Ascophyllum nodosum*) RD2 at the concentration in the soil expressed in mg/kg of soil: 780 mg/kg of soil (or ppm).

Composition of calcium formate (F200) at 780 mg/kg of soil (or ppm)+algae powder RD2 at 780 mg/kg of soil.

Composition of calcium acetate (ACA) at 780 mg/kg of soil (or ppm)+algae powder RD2 at 780 mg/kg of soil.

Composition of sodium formate (FNA) at 780 mg/kg of soil (or ppm)+algae powder RD2 at 780 mg/kg of soil.

Composition of acetic acid (ACT) at 780 mg/kg of soil (or ppm) +algae powder RD2 at 780 mg/kg of soil.

Negative control H2O.

2) Number of repetitions/variant: 5 repetitions.

3) Nematodes: 353 nematodes±52/microcosm (i.e. soil+nematodes+product tested).

4) Conditions:

Temperature (21° C.).

The soil used is a soil of sandy texture (79% sand; 14.1% loam; 6.9% clay), with a pH of 7.8 and a level of organic matter of 29.2 g/kg. The soil was sterilized by autoclaving (60 min at 105° C.) before being used.

Amount of soil: 4.04 g±0.03 g of soil per microcosm.

Height of column of soil: 2 cm.

Soil moisture 22.5%±0.2%.

Nematodes deposited 1 h before depositing the test product.

Incubation time with the test product: 5 h.

Active passage over water to test the reversibility of the effect over 6 days (kinetics over 144 h).

Results

The results are presented in FIGS. 4 to 7.

In the presence of water (negative control) in the experimental conditions tested, 100% of the nematodes left the microcosm of the soil in the first 20 hours.

In the presence of Fluopyram (positive control) in the experimental conditions tested, no nematode had left the microcosm of the soil after 160 hours.

In each of the experimental conditions tested, combining the alga extract and carboxylic acid made it possible to obtain a synergistic nematostatic effect compared to the alga extract alone or the carboxylic acid alone.

The nematostatic effect was reversible since at least 40% of the nematodes regained their mobility after 160 hours.

The compositions tested therefore have a nematostatic effect and can be used for repelling nematodes from seedlings and/or young roots, at the necessary time for establishment and/or the start of growth of the plant.

The invention claimed is:

1. A nematostatic composition comprising (i) a brown alga or a brown alga extract and (ii) a formic acid.

2. The composition as claimed in claim 1, wherein the brown alga is selected from *Ascophyllum nodosum*, *Fucus serratus*, *Fucus vesiculosus*, *Laminaria hyperborea*, *Laminaria saccharina*, *Laminaria digitata* and *Sargassum spp.*

3. The composition as claimed in claim 1, wherein the brown alga or brown alga extract is in dry form.

4. The composition as claimed in claim 1, wherein the formic acid is in the form of a salt.

5. The composition as claimed in claim 1, wherein the formic acid is in the form of a salt, the salt of formic acid being selected from a salt of an alkali metal; a salt of an alkaline earth metal; a salt of a transition metal; an ammonium salt; a phosphonium salt or a sulfonium salt.

6. The composition as claimed in claim 1, wherein the formic acid is in dry form.

7. The composition as claimed in claim 1, further comprising at least one fertilizer.

8. The composition as claimed in claim 1, further comprising at least one amendment.

9. The composition as claimed in claim 1, wherein the content of formic acid is in the range from 30 to 90 wt % and the content of brown alga or of brown alga extract is in the range from 10 to 70 wt %, relative to the total weight of the composition.

10. The composition as claimed in claim 1, wherein the brown alga is *Ascophyllum nodosum*.

11. The composition as claimed in claim 1, wherein the brown alga or brown alga extract is in powder form.

12. The composition as claimed in claim 1, wherein the formic acid is in powder form.

13. A method of soil treatment intended to promote plant growth by reducing nematodes' access to the roots of said plant, comprising supplying the soil with an effective amount of the composition as claimed in claim 1.

14. The method as claimed in claim 13, wherein the nematodes are pathogenic nematodes selected from the genera *Achlysiella*, *Anguina*, *Aphasmatylenchus*, *Aphelenchoides*, *Belonolaimus*, *Bursaphelenchus*, *Criconemella*, *Ditylenchus*, *Helicotylenchus*, *Hemicriconemoides*, *Heterodera*, *Hirschmanniella*, *Hoplolaimus*, *Longidorus*, *Meloidogyne*, *Nacobbus*, *Paralongidorus*, *Pratylenchus*,

*Radopholus*, *Rotylenchulus*, *Rotylenchus*, *Scutellonema*, *Trichodorus*, *Trophotylenchulus*, *Tylenchorhynchus*, *Tylenchulus* and *Xiphinema*.

15. The method as claimed in claim 14, wherein the composition is applied to the soil at the pre-sowing stage, pre-emergence of the plant or post-emergence of the plant.

16. The method as claimed in claim 14, wherein the composition is supplied to the soil in an amount from 1 to 50 kg/ha.

17. The method as claimed in claim 14, wherein the plant is selected from beet, maize, hard wheat, colza, carrot, potato, the Solanaceae, the Cucurbitaceae, lettuce or grapevine.

18. The method as claimed in claim 14, wherein the nematodes are pathogenic nematodes.

* * * * *